(12) United States Patent
Cosentino

(10) Patent No.: US 9,371,127 B2
(45) Date of Patent: Jun. 21, 2016

(54) COMPOSITE STRUCTURE COMPRISING A STRINGER WITH A PAD EMBEDDED IN THE RECESS OF A PANEL AND METHOD OF TRANSMITTING FORCES

(75) Inventor: Enzo Cosentino, Bristol (GB)

(73) Assignee: Airbus Operations Limited, Bristol (GB)

( * ) Notice: Subject to any disclaimer, the term of this patent is extended or adjusted under 35 U.S.C. 154(b) by 1704 days.

(21) Appl. No.: 12/451,178

(22) PCT Filed: Apr. 15, 2008

(86) PCT No.: PCT/GB2008/050260
§ 371 (c)(1),
(2), (4) Date: Oct. 29, 2009

(87) PCT Pub. No.: WO2008/132498
PCT Pub. Date: Nov. 6, 2008

(65) Prior Publication Data
US 2010/0127122 A1    May 27, 2010

(30) Foreign Application Priority Data

Apr. 30, 2007    (GB) .................................. 0708333.0

(51) Int. Cl.
*B64C 1/00* (2006.01)
*B64C 1/12* (2006.01)
*B29D 99/00* (2010.01)
*B29L 31/30* (2006.01)

(52) U.S. Cl.
CPC ............. *B64C 1/12* (2013.01); *B29D 99/0014* (2013.01); *B29L 2031/3076* (2013.01); *B29L 2031/3082* (2013.01); *B29L 2031/3085* (2013.01); *B64C 2001/0072* (2013.01); *Y02T 50/433* (2013.01)

(58) Field of Classification Search
USPC .................. 244/119, 131, 132, 123.8, 123.1; 52/364, 801.1, 801.11, 483.1, 783.1
See application file for complete search history.

(56) References Cited

U.S. PATENT DOCUMENTS 4,228,629 A * 10/1980 Chalmers et al. ................ 52/460
5,935,698 A *  8/1999 Pannell ......................... 428/223

(Continued)

FOREIGN PATENT DOCUMENTS

EP    0 749 825    12/1996
EP    1 566 334     8/2005

(Continued)

OTHER PUBLICATIONS

Search Report for GB 0708333.0 dated Oct. 6, 2007.
International Search Report for PCT/GB2008/050260 mailed Aug. 6, 2008.
Written Opinion for PCT/GB2008/050260 mailed Aug. 6, 2008.
Japanese Office Action mailed Jul. 29, 2014 in JP 2010-504859 and English translation, 5 pages.

*Primary Examiner* — Philip J Bonzell
(74) *Attorney, Agent, or Firm* — Nixon & Vanderhye P.C.

(57) ABSTRACT

A composite structure including a panel and a stringer bonded to the surface of the panel, the stringer having an end surface and a pair of sides extending lengthwise along the stringer away from the end surface. The surface of the panel is formed with a first wall which engages the end surface of the stringer and a second wall which engages another part of the stringer. Compressive forces are transmitted from the panel to the stringer by a normal reaction between the first wall formed in the surface of the panel and the end surface of the stringer. Tensile forces are transmitted from the panel to the stringer by a normal reaction between the second wall formed in the surface of the panel and the other surface of the stringer.

10 Claims, 4 Drawing Sheets

(56) References Cited

U.S. PATENT DOCUMENTS

| | | | |
|---|---|---|---|
| 5,981,023 A | 11/1999 | Tozuka et al. | |
| 2004/0021039 A1 | 2/2004 | Jones | |
| 2005/0112394 A1* | 5/2005 | Pham et al. | 428/544 |
| 2005/0211846 A1* | 9/2005 | Leon-Dufour et al. | 244/126 |
| 2006/0226287 A1 | 10/2006 | Grantham et al. | |

FOREIGN PATENT DOCUMENTS

| | | |
|---|---|---|
| JP | H09-1681 | 1/1997 |
| WO | WO 2004/076769 | 9/2004 |

* cited by examiner

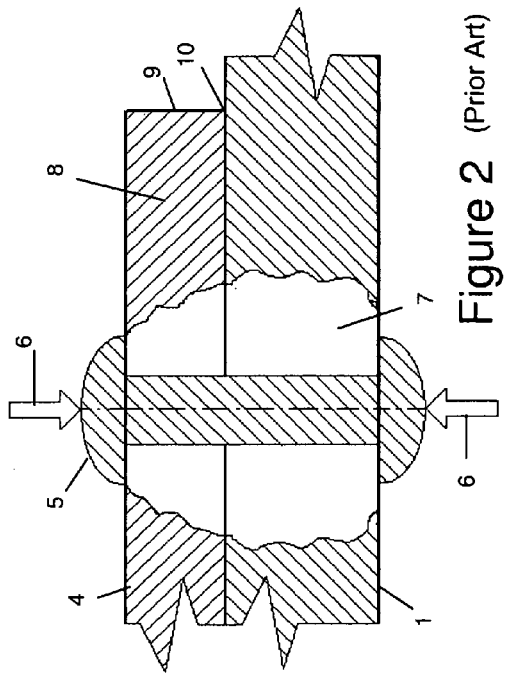
Figure 1 (Prior Art)
Figure 2 (Prior Art)
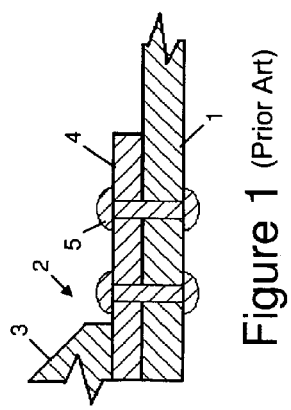
Figure 3 (Prior Art)
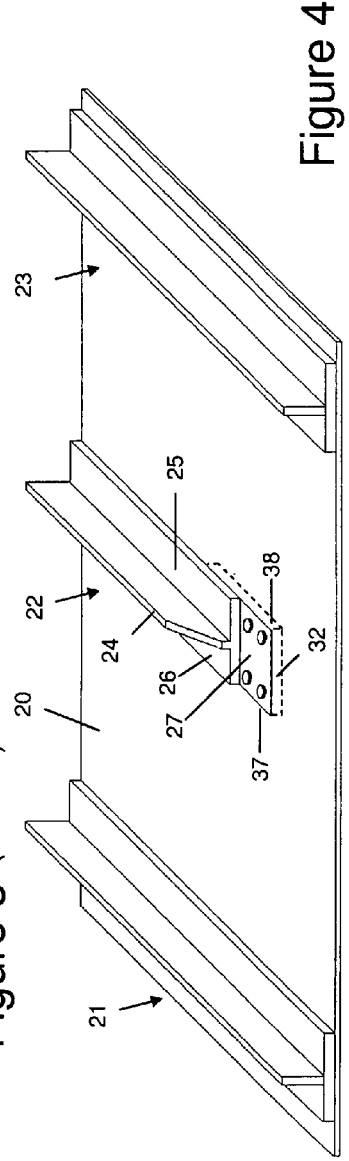
Figure 4

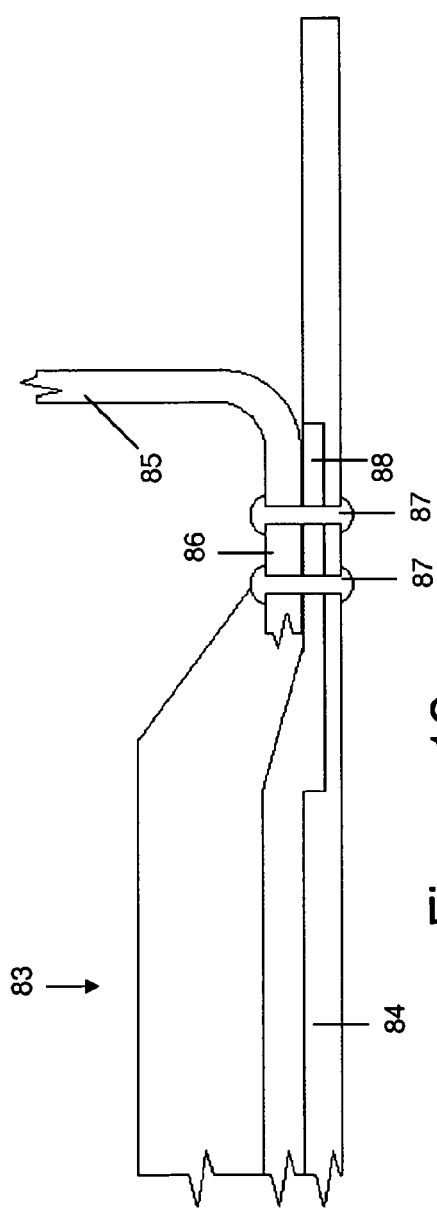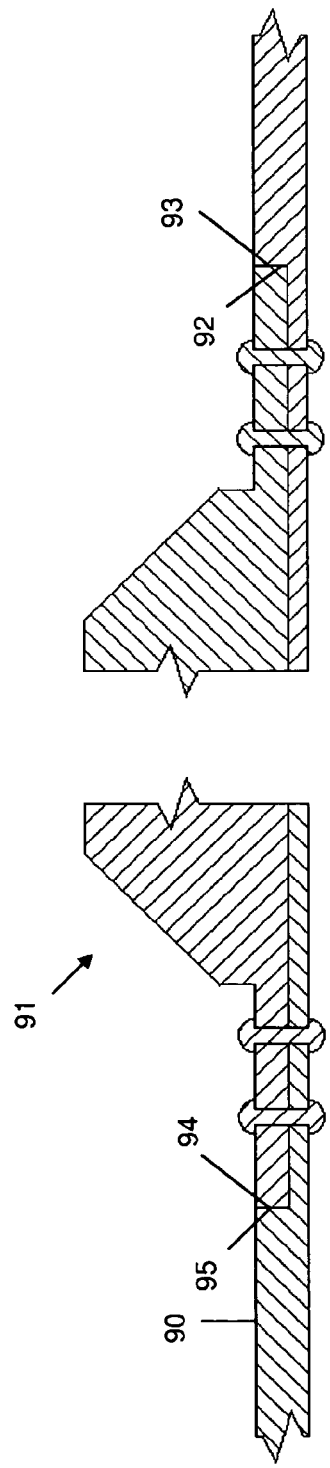

COMPOSITE STRUCTURE COMPRISING A STRINGER WITH A PAD EMBEDDED IN THE RECESS OF A PANEL AND METHOD OF TRANSMITTING FORCES

This application is the U.S. national phase of International Application No. PCT/GB2008/050260 filed 15 Apr. 2008 which designated the U.S. and claims priority to British Patent Application No. 0708333.0 filed 30 Apr. 2007, the entire contents of each of which are hereby incorporated by reference.

FIELD OF THE INVENTION

The present invention relates to a composite structure comprising: a panel; and a stringer bonded to the surface of the panel, the stringer having an end surface and a pair of sides extending lengthwise along the stringer away from the end surface.

BACKGROUND OF THE INVENTION

FIG. 1 shows a run-out portion of a panel 1 which may form, for example, the skin of an aircraft wing or fuselage. The panel is reinforced by a series of elongate stringers which run along the length of the panel, one of which is shown in cross-section in FIG. 1. The stringer 2 comprises a web 3 extending at right angles to the panel, and a flange 4 engaging the panel 1.

The stringer 2 is terminated as shown. The web 3 is tapered near the termination in order to facilitate load transfer from the skin to the stringer, by providing a gradual increase in transverse bending and axial stiffness and relieving local stress concentrations. Furthermore, the flange 4 extends beyond the end of the web in order to render the stiffener tip more compliant and capable of following the panel when it is bent.

Pre-tensioned bolts 5 are used in order to prevent delamination or disbonding. As shown in FIG. 2, the pre-tensioning load 6 causes a portion 7 of the panel 1 and flange 4 to be in compression. However there is an end region 8 between the compressed region 7 and the tip 9 of the flange 4 which is not in compression. Therefore the bolts 5 cannot delay failure initiating at the interface 10 where the tip 9 of the flange 4 meets the panel 1.

An improved design is shown in FIG. 3. In this case a washer 11 is used to transfer the through-thickness compression region up to the tip of the flange, thus suppressing the peeling failure mode at the tip. However, the solution of FIG. 3 does not suppress sliding failure modes at the tip.

SUMMARY OF THE INVENTION

A first aspect of the invention provides a composite structure comprising: a panel; and a stringer bonded to the surface of the panel, the stringer having an end surface and a pair of sides extending lengthwise along the stringer away from the end surface, wherein the surface of the panel is formed with a first wall which engages the end surface of the stringer and a second wall which engages another part of the stringer.

A second aspect of the invention provides a method of transmitting forces in the composite structure of the first aspect of the invention, the method comprising:

transmitting compressive forces from the panel to the stringer by a normal reaction between the first wall formed in the surface of the panel and the end surface of the stringer; and transmitting tensile forces from the panel to the stringer by a normal reaction between the second wall formed in the surface of the panel and the other surface of the stringer.

The bond between the stringer and the panel may be formed by applying a layer of adhesive between the parts, by co-curing the parts, or by bonding the parts together in any other way.

The panel may formed from a single piece, or may be formed from two or more plies of material. In this case, each ply is typically formed from a composite material such as carbon-fibre impregnated with an epoxy resin matrix.

In one embodiment the stringer has a second end surface at an opposite end of the stringer to the first end surface, and the second wall formed in the panel engages the second end surface of the stringer.

In other embodiments the stringer comprises a base which is bonded to the surface of the panel and a pad which protrudes from the base and is embedded in a recess in the panel. The pad has a first end surface which engages a first end wall of the recess and a second end surface which engages a second end wall of the recess. In this case the recess may extend across the width of the entire panel (and thus have no side walls) but more preferably the pad has a first side surface which engages a first side wall of the recess and a second side surface which engages a second side wall of the recess. The pad may be bonded to the recess, but more preferably the bond between the base of the stringer and the surface of the panel terminates at the pad. In this case, other means (such as fasteners) may be employed to fix the pad into the recess.

The walls may extend at an acute angle across the width of the stringer, or may be formed with a concave or convex shape. However more preferably the first and second walls formed in the surface of the panel are oriented in substantially opposite directions, and extend across the width of the stringer, substantially at right angles to the length of the stringer. This arrangement enables the normal reaction forces to be transmitted efficiently between the panel and stringer.

BRIEF DESCRIPTION OF THE DRAWINGS

Embodiments of the invention will now be described with reference to the accompanying drawings, in which:

FIG. 1 is a longitudinal cross-section through a first conventional stringer run-out;

FIG. 2 is an enlarged view of part of the stringer-run-out of FIG. 1 illustrating the effect of the pre-tensioning load;

FIG. 3 is a longitudinal cross-section through a second conventional stringer run-out;

FIG. 4 is a perspective view of a composite structure according to a first embodiment of the present invention;

FIG. 12 is a longitudinal section of a composite structure according to a further embodiment of the invention; and FIG. 13 is a longitudinal section of a composite structure according to a further embodiment of the invention.

DETAILED DESCRIPTION OF EMBODIMENT(S)

Figure 5:
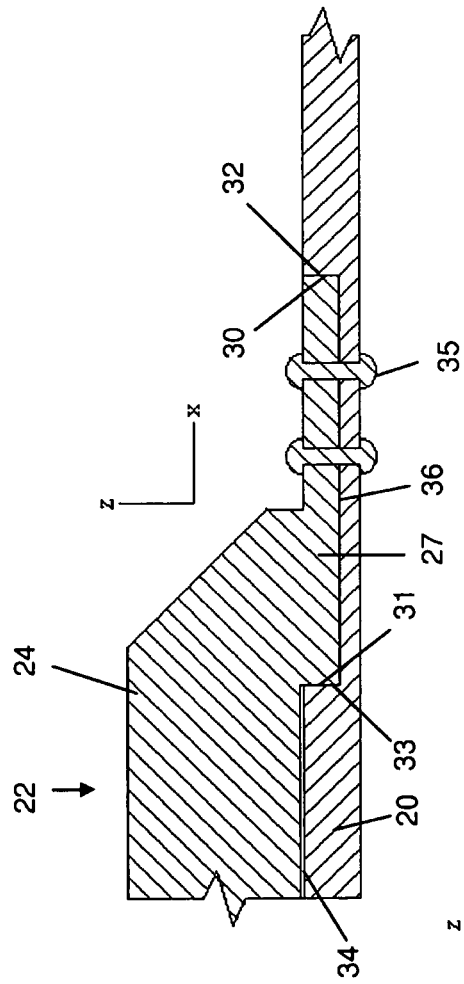
FIGS. 5-7 are longitudinal cross-sections through a run-out section of one of the stringers shown in FIG. 4.

FIG. 4 shows a portion of a composite structure which may form, for example, the skin of an aircraft wing or fuselage. The structure comprises a panel 20 and a series of stringers 21-23 bonded to the surface of the panel 20. Each stringer has a pair of ends (each end being known conventionally as a "stringer run-out") and a pair of sides extending lengthwise between the stringer run-outs. In the case of an aircraft wing, the stringers run in a span-wise direction from the root of the wing towards its tip.

FIG. 4 shows only a small portion of the composite structure. The portion shown in FIG. 4 includes a run-out of the stringer 22, and intermediate sections of the stringers 21,23 (that is, the run-outs of the stringers 21,23 are not shown). Each stringer comprises a web 24 extending at right angles to the panel 20 and a pair of flanges 25,26 which are co-planar with the panel.

The web 24 is tapered at the run-out in order to facilitate load transfer from the skin to the stringer, by providing a gradual increase in transverse bending and axial stiffness and relieving local stress concentrations.

A pad 27 protrudes downwardly from the base of the stringer 22 and extends beyond the ends of the web 24 and flanges 25,26. The pad 27 is embedded in a recess in the panel which is shown in longitudinal cross-section in FIG. 5. The recess has a right-hand end wall 30 and a left-hand end wall 31. The walls 30,31 are oriented in substantially opposite directions, and extend across the width of the stringer substantially at right angles to its length. The end wall 30 engages a right-hand end surface 32 of the pad 27, and the end wall 31 engages a left-hand end surface 33 of the pad 27. The recess also has side walls running parallel with the length of the stringer which engage respective side walls of the pad 27 at interfaces 37,38 shown in FIG. 4.

The panel 20 is manufactured by laying up a stack of "prepregs" (layers of uni-axial carbon fibre impregnated with an epoxy resin matrix) then curing the stack in an autoclave. The recess may be cut in the surface of the panel (for instance by applying an acid to the panel in the desired area). Alternatively the recess may be formed during the lay-up process. That is, each layer of prepreg is laid by an automated tape laying (ATL) machine, and the ATL machine lays a series of layers up to the base of the recess, then terminates successive layers in the area of the recess.

The stringer 22 is manufactured by laying up two L-shaped preforms, each preform being formed by laying a stack of prepregs on a respective mandrel, then placing the L-shaped preforms back-to-back in an autoclave, and co-curing the L-shaped preforms.

The base of the stringer 22 is then coated with a layer of adhesive 34. The adhesive layer 34 terminates at the left-hand end surface 33 of the pad 27. The stringer is then fitted into place, the adhesive 34 hardens, and fasteners 35 are fitted and pre-tensioned.

Figure 6:
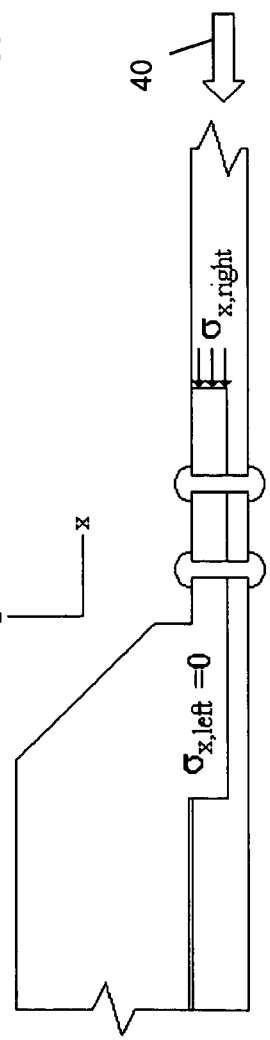
Figure 7:
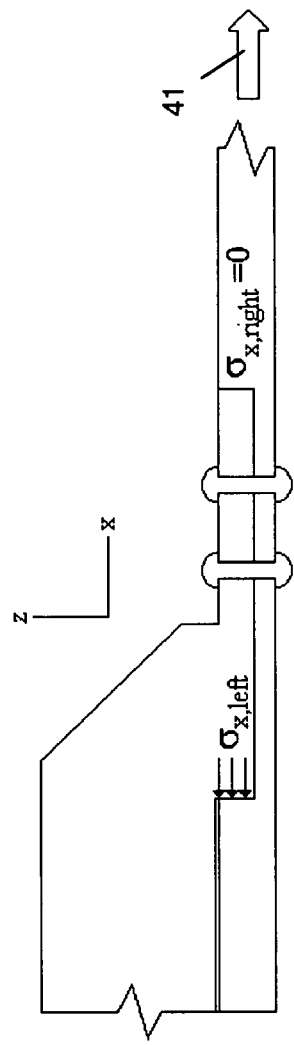

As shown in FIG. 6, when a compressive load 40 is applied, then this load is transferred from the panel to the stringer by a normal reaction $\sigma_{x,right}$ at the right-hand interface between the surfaces 30,32. As shown in FIG. 7, when a tensile load 41 is applied, then this load is transferred from the panel to the stringer by a normal reaction $\sigma_{x,left}$ at the left-hand interface between the surfaces 31,33. The lack of bond at these interfaces means that tensile normal stresses cannot be transmitted across the interface. No shear reaction is present at the interface 36 between the base of the pad 27 and the base of the recess, because this interface 36 also has no adhesive.

Neither stress concentrations nor edge effects are triggered in the embedded configuration shown in FIGS. 4 and 5, therefore the global strength of the joint is likely to be high.

In the view of FIG. 5, the angles between the surfaces 30-33 and the base of the recess are all approximately 90 degrees. In alternative embodiments (not shown) these angles may be greater or less than 90 degrees, or the surfaces 30-33 may be non-planar.

In a further embodiment (not shown) the layer of adhesive 34 may also coat the base, end walls, and side walls of the recess. In this case only half of the total local in-plane load will be transferred by the tensile-loaded wall. The other half will be taken by the compressive loaded wall and will not any trigger any fracture modes. In terms of damage tolerance and fail-safe related to crack propagation, then if a crack occurs in one of the walls, it will probably propagate through the assembly, jumping from the adhesive to the adjacent lamina because the lamina requires a lower amount of energy to let the crack propagate through.

Alternatively the stringer may be co-cured with the panel to form a co-cured bond between the pad and the recess. A co-cured bond may perform better than an adhesive bond. If a crack occurs in the resin layer between the embedded pad 27 and the panel in the tensile-loaded wall, then it will propagate through the same layer, as the adjacent lamina are tougher than the resin itself. Moreover, the remaining compressively loaded wall covers the failure of the other wall, carrying almost the entire amount of load previously reacted by the failed wall. Therefore the embedded pad achieves redundancy in terms of fail-safe requirements.

If adhesive is included along the interface 36 (or if the stringer and panel are bonded along this interface by co-curing) then a shear stress could be present. However this stress component is low and can be neglected if the pad 27 is designed with an axial stiffness approximating that of the panel.

Alternative embedded pad geometries are shown in FIGS. 8-11.

Figure 8:
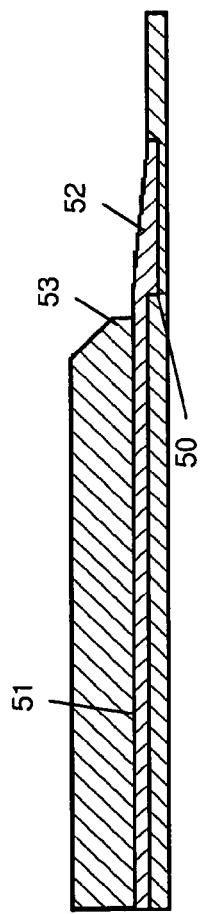
FIGS. 8-11 are longitudinal cross-sections through run-out sections of various alternative stringer embodiments.

In the example of FIG. 8, the left-hand interface 50 between the stringer pad and the recess is positioned to the right-hand side of the tip 53 of the web. Note also that the flange 51 has a tapered upper face 52 at the run-out of the stringer, to ensure a smooth load transfer and increase the strength required to disbond.

Figure 9:
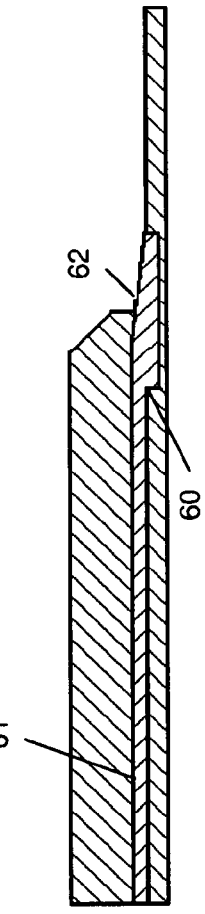

In the example of FIG. 9, the left-hand interface 60 between the stringer pad and the recess is positioned to the left-hand side of the tip of the web. Note also that the flange 61 has a tapered upper face 62 at the run-out of the stringer.

Figure 10:
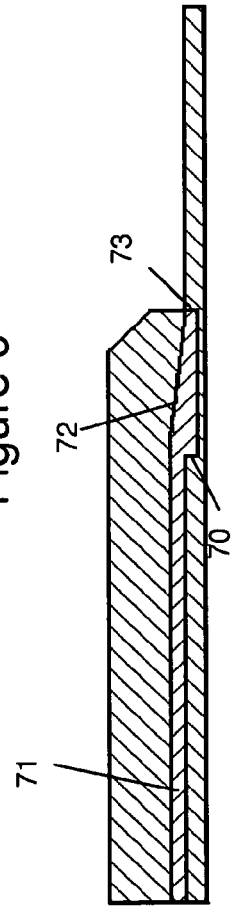

In the example of FIG. 10, the left-hand interface 70 between the stringer pad and the recess is positioned to the left-hand side of the tip of the web. Note also that the flange 71 has a tapered upper face 72 at the run-out of the stringer, and the end surface 73 of the stringer is in line with the tip of the web.

Figure 11:
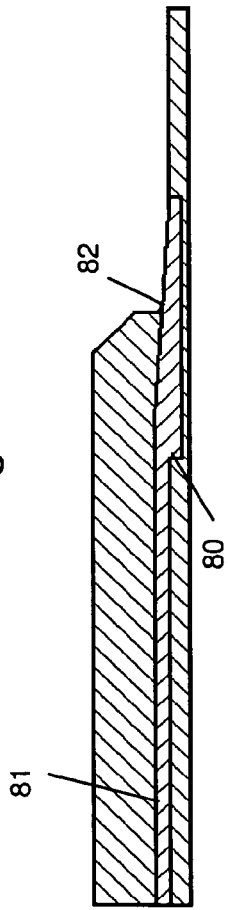

In the example of FIG. 11, the left-hand interface 80 between the stringer pad and the recess is positioned to the left-hand side of the tip of the web. Note also that the flange 81 has a tapered upper face 82 at the run-out of the stringer.

FIG. 12 shows a composite structure according to a further embodiment of the invention comprising a panel 84; and a stringer 83 bonded to the surface of the panel. The stringer and panel are similar to the geometries shown in FIGS. 8-11, but in this case the stringer is bolted to a rib which runs across the width of the panel in a chord-wise direction (that is, in and out of the plane of FIG. 12). The rib comprises a web 85 and flange 86. The pad 88 of the stringer and the rib flange 86 are bolted to the panel by bolts 87.

FIG. 13 shows a composite structure according to a further embodiment of the invention comprising a panel 90; and a stringer 91 bonded to the surface of the panel. FIG. 13 shows both ends of the stringer, in contrast with FIGS. 4-12 which show only one end of the stringer.

The surface of the panel is formed with a right-hand end wall 92 which engages the right-hand end 93 of the stringer, and a left-hand end wall 94 which engages the left-hand end of the stringer. Note that the base of the stringer is completely flat in the embodiment of FIG. 13. In other words there are no pads protruding from the base at either end of the stringer. The walls 92,93 may be provided in the surface of the panel by forming a recess as described above, or by fixing projecting parts to the panel at either end of the stringer.

When a compressive load is applied then this load is transferred from the panel to the stringer by a normal reaction at the right-hand interface 92,93 and when a tensile load is applied then this load is transferred from the panel to the stringer by a normal reaction at the left-hand interface 94,95.

Although the invention has been described above with reference to one or more preferred embodiments, it will be appreciated that various changes or modifications may be made without departing from the scope of the invention as defined in the appended claims.

The invention claimed is:

1. A composite structure comprising:
a panel; and
a stringer bonded to a surface of the panel, the stringer having an end surface and a pair of sides extending lengthwise along the stringer away from the end surface, wherein the surface of the panel is formed with a first wall which abuts the end surface of the stringer and a second wall opposite to said first wall, said second wall abuts another part of the stringer.

2. The structure of claim 1, wherein the stringer has a second end surface at an opposite end of the stringer to the first end surface, and wherein the second wall formed in the panel engages the second end surface of the stringer.

3. The structure of claim 1 wherein the first and second walls formed in the surface of the panel are oriented in substantially opposite directions.

4. The structure of claim 1 wherein the first and second walls formed in the surface of the panel extend across the width of the stringer, substantially at right angles to the length of the stringer.

5. An aircraft skin comprising the composite structure of claim 1.

6. The structure of claim 1, wherein the stringer comprises a base which is bonded to the surface of the panel and a pad which protrudes from the base and is embedded in a recess in the panel; and wherein the pad has a first end surface which engages a first end wall of the recess and a second end surface which engages a second end wall of the recess.

7. The structure of claim 6 wherein the pad has a first side surface which engages a first side wall of the recess and a second side surface which engages a second side wall of the recess.

8. The structure of claim 6 wherein the bond between the base of the stringer and the surface of the panel terminates at the pad.

9. A method of transmitting forces in the composite structure of claim 1, the method comprising:
transmitting compressive forces from the panel to the stringer by a normal reaction between the first wall formed in the surface of the panel and the end surface of the stringer; and
transmitting tensile forces from the panel to the stringer by a normal reaction between the second wall formed in the surface of the panel and the other surface of the stringer.

10. The method of claim 9 wherein substantially no tensile forces are transmitted from the panel to the stringer between the first wall formed in the surface of the panel and the end surface of the stringer, and substantially no compressive forces are transmitted from the panel to the stringer between the second wall formed in the surface of the panel and the other surface of the stringer.

\* \* \* \* \*